United States Patent
Wang

(10) Patent No.: US 9,564,938 B1
(45) Date of Patent: Feb. 7, 2017

(54) RADIO WAVES GUIDING WINDOW FOR METAL CASE AND MANUFACTURING METHOD THEREOF

(71) Applicant: HUANG CHIEH METAL TECHNOLOGY CO., LTD, New Taipei (TW)

(72) Inventor: Chin-Han Wang, New Taipei (TW)

(73) Assignee: HUANG CHIEH METAL TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 14/971,682

(22) Filed: Dec. 16, 2015

(51) Int. Cl.
| | |
|---|---|
| *H04M 1/00* | (2006.01) |
| *H04B 1/3827* | (2015.01) |
| *H01Q 1/24* | (2006.01) |
| *H04M 1/02* | (2006.01) |

(52) U.S. Cl.
CPC ............ *H04B 1/3827* (2013.01); *H01Q 1/243* (2013.01); *H04M 1/026* (2013.01); *H04M 1/0249* (2013.01)

(58) Field of Classification Search
CPC ........ H01Q 1/242; H01Q 1/243; H01Q 1/244; H01Q 1/084; H04B 1/3833; H04B 1/385; H04B 1/38; H04B 1/2014
USPC ....................... 455/550.1, 575.1, 575.7, 90.3
See application file for complete search history.

(56) References Cited

U.S. PATENT DOCUMENTS

| | | | |
|---|---|---|---|
| 2010/0300518 A1* | 12/2010 | Moslehi | H01L 31/035281 136/255 |
| 2011/0256310 A1* | 10/2011 | Lee | G06F 1/1616 427/126.3 |
| 2014/0226293 A1* | 8/2014 | Sato | G06K 19/07769 361/752 |

* cited by examiner

*Primary Examiner* — Nhan Le

(57) ABSTRACT

A radio waves guiding window for a metal case is capable of transmitting radio waves smoothly and contains: a metal case. The metal case includes a modification area defined at a position thereof where corresponds to an antenna, wherein a metal material thickness is formed by ceramizating the modification area in a micro-arc oxidation (MAO) process, and a metal material of the modification area is modified to a metal oxide in the micro-arc oxidation (MAO) process. Accordingly, the metal case has brilliant appearance, transmits the radio waves smoothly, and is simplified.

14 Claims, 6 Drawing Sheets

US 9,564,938 B1

RADIO WAVES GUIDING WINDOW FOR METAL CASE AND MANUFACTURING METHOD THEREOF

FIELD OF THE INVENTION

The present invention relates to a radio waves guiding window for a metal case which is reinforced and is modified to a metal oxide easily in a micro-arc oxidation (MAO) process.

BACKGROUND OF THE INVENTION

A conventional electronic product with radio wave communication transmits radio signals through an antenna, but the antenna exposes outside the electronic product. To improve appearance of the electronic product, the antenna is disposed in a metal case of the electronic product. However, a metal or a metal mesh of the metal case shields transmission of the radio signals.

The electronic product with radio wave communication contains mobile phone, walkie-talkie, and wearable electronics. For example, a protective case of the mobile phone is made of any one of plastic material (such as polycarbonate), metal material (such as aluminum alloy, magnesium alloy, or titanium alloy), and glass (such as alkali aluminosilicate glass and gorilla glass). The plastic material is cheap, lightweight and is produced easily, but it cannot dissipate heat efficiently. The metal material reinforces the protective case of the mobile phone and dissipates heat effectively, yet it shields transmission of the radio signals.

To overcome defects of the protective case made of metal material, a radio waves guiding window made of plastic material or glass is configured on the protective case of the electronic product so as to transmit the radio signals excellently. However, an appearance of the radio waves guiding window made of plastic material or glass is not consistent to the protective case made of metal material.

Antenna device and electronic apparatus including antenna device are disclosed in US Publication No. 20140247188 A1 and contain a slot cut on a metal case of the electronic apparatus, and a feed coil is arranged around the slot so as to transmit radio signals. Antenna device and communication terminal device are disclosed in US Publication No. 20140203981 A1 and contain a metal case and a feed coil, wherein the metal case has a cut slit so as to accommodate the feed coil in the metal case, such that the feed coil couples with the metal case and is fixed close to the cut slit.

Antenna structure fixed in metal case is taught in CN Publication No. 103633434 A, and integration mechanism of metal case of electronic apparatus and antenna is taught in CN Publication No. 104584324 A, wherein the metal case has a cut slit, and the antenna is in connection with the metal case.

Nevertheless, the metal case having the cut slit influences appearance of the electronic apparatus. To close the cut slit, a plastic cap covers on the cut slit, but the plastic cap cannot connect with the metal case flatly.

The present invention has arisen to mitigate and/or obviate the afore-described disadvantages.

SUMMARY OF THE INVENTION

One aspect of the present invention is to provide a radio waves guiding window for a metal case which is reinforced and is modified to a metal oxide easily in a micro-arc oxidation (MAO) process.

Another aspect of the present invention is to provide a radio waves guiding window for a metal case which is capable of transmitting radio waves smoothly, and the metal case has brilliant appearance, transmits the radio waves smoothly, and is simplified.

To obtain the above aspects, a radio waves guiding window for a metal case provided by the present invention contains: a metal case. The metal case includes a modification area defined at a position thereof where corresponds to an antenna, wherein a metal material thickness is formed by ceramizating the modification area in a micro-arc oxidation (MAO) process, and a metal material of the modification area is modified to a metal oxide in the micro-arc oxidation (MAO) process.

Preferably, the metal case is made of any one of aluminum alloy, magnesium alloy, and titanium alloy.

Preferably, the modification area is a flat thinning casing and has a thickness within 10 um to 800 um.

Preferably, the modification area is a flat thinning casing and has a thickness within 200 um to 600 um.

Preferably, the modification area has a honeycomb structure with plural cavities formed in the honeycomb structure, and a thickness of the honeycomb structure is within 10 um to 800 um.

Preferably, the thickness of the honeycomb structure is within 200 um to 600 um.

Preferably, the plural cavities of the honeycomb structure do not pass through the metal case.

Preferably, the plural cavities of the honeycomb structure pass through the metal case, each of the plural cavities of the honeycomb structure is filled with dielectric material powders with a low dielectric coefficient, and the dielectric material powders are any one of silicon dioxide ($SiO_2$), magnesium oxide (MgO), aluminum oxide ($Al_2O_3$), and boron nitride (BN).

DETAILED DESCRIPTION OF THE PREFERRED EMBODIMENTS

Figure 1:
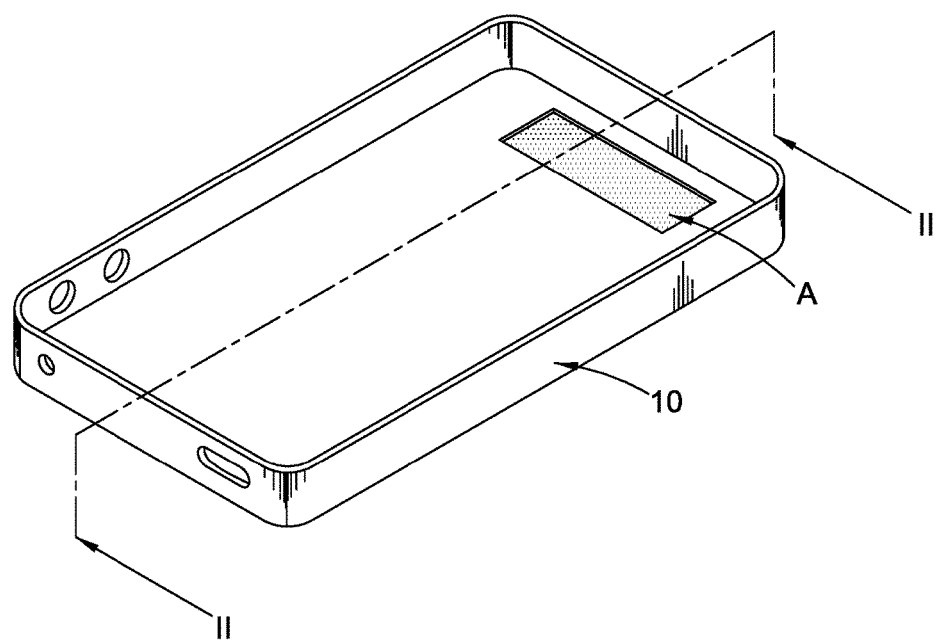
FIG. 1 is a perspective view showing the assembly of a metal case of an electronic product with radio wave communication according to a preferred embodiment of the present invention.
Figure 2:
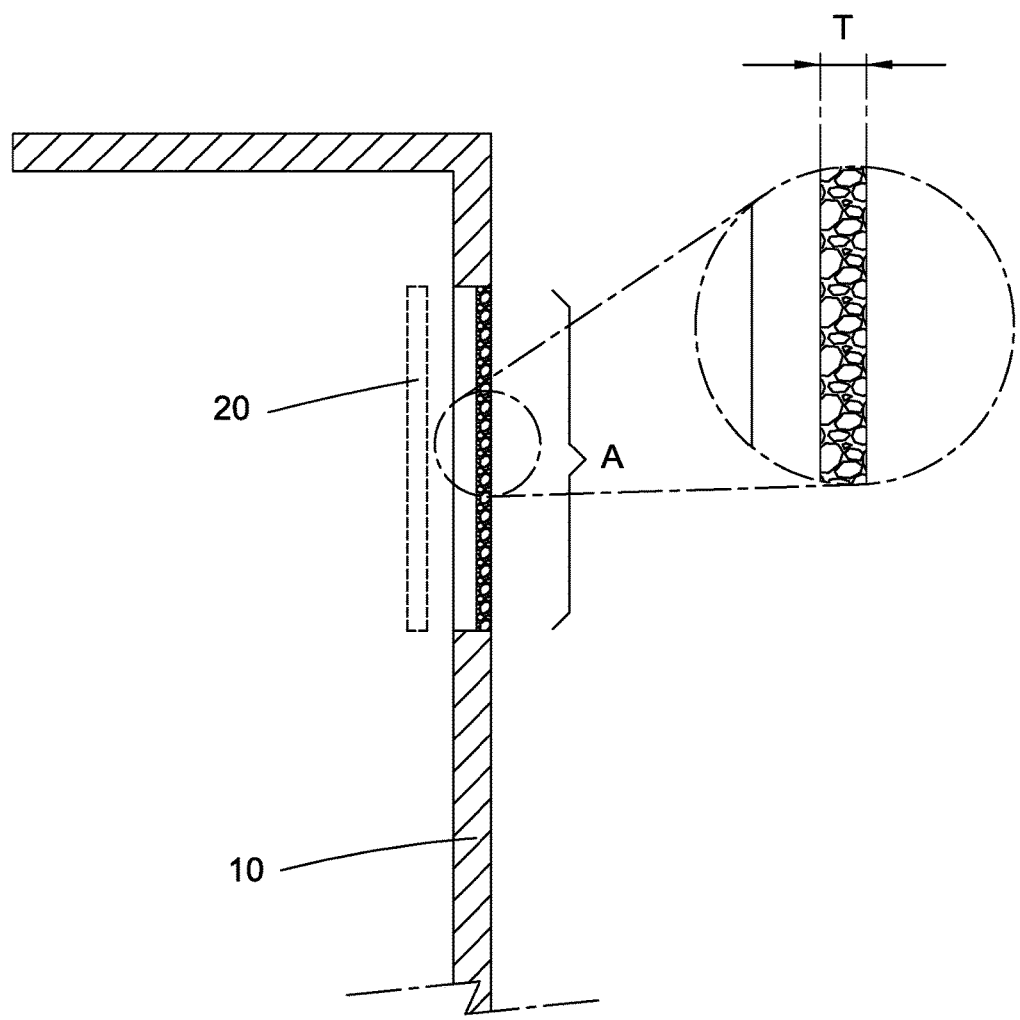
FIG. 2 is a cross sectional view taken along the line of II-II of FIG. 1.

With reference to FIGS. 1 and 2, a metal case 10 of an electronic product with radio wave communication according to a preferred embodiment of the present invention comprises an antenna 20 disposed therein. The metal case 10 is made of any one of aluminum alloy, magnesium alloy, and titanium alloy.

The metal case 10 also comprises a modification area A defined at a position thereof where corresponds to a radiator body of the antenna 20, and the modification area A has a metal material thickness T which is formed by ceramizating the modification area A in a micro-arc oxidation (MAO) process, wherein the modification area A modifies the metal case 10 to a metal oxide in the micro-arc oxidation (MAO) process, for example, a metal material of the metal case 10 is modified to aluminum oxide from aluminum alloy, to magnesium oxide (MgO) from magnesium alloy or to titanium dioxide (TiO2) from titanium alloy, hence the modification area A forms a radio waves guiding window so as to transmit radio waves smoothly.

A manufacturing method of making a radio waves guiding window for a metal case according to a preferred embodiment of the present invention comprises steps of:

defining a modification area A at a position of a metal case 10 where corresponds to a radiator body of an antenna 20;

forming a metal material thickness T in the modification area A in a thinning process; and modifying the modification area A of the metal case 10 in a micro-arc oxidation (MAO) process, wherein a metal material of the modification area A is modified to a metal oxide, and the modification area A forms a radio waves guiding window to transmit radio waves smoothly.

In the thinning process, the modification area A forms the metal material thickness T, and the metal material thickness T is modified to a metal oxide thickness in the modification area A in the micro-arc oxidation (MAO) process.

Referring to FIG. 2, the modification area A is a flat thinning casing and has a thickness within 10 um to 800 um. In another embodiment, the thickness of the flat thinning casing is within 200 um to 600 um, and a metal oxide layer inward forms from each of two side surfaces of the flat thinning casing in the micro-arc oxidation (MAO) process until the flat thinning casing completely becomes ceramic metal oxide, thus producing the radio waves guiding window in the modification area A to transmit the radio waves smoothly. In another embodiment, the thickness of the flat thinning casing is 500 um, and a metal oxide layer inward forms from each of two side surfaces of the flat thinning casing in the micro-arc oxidation (MAO) process until the flat thinning casing completely becomes a metal oxide.

Figure 3:
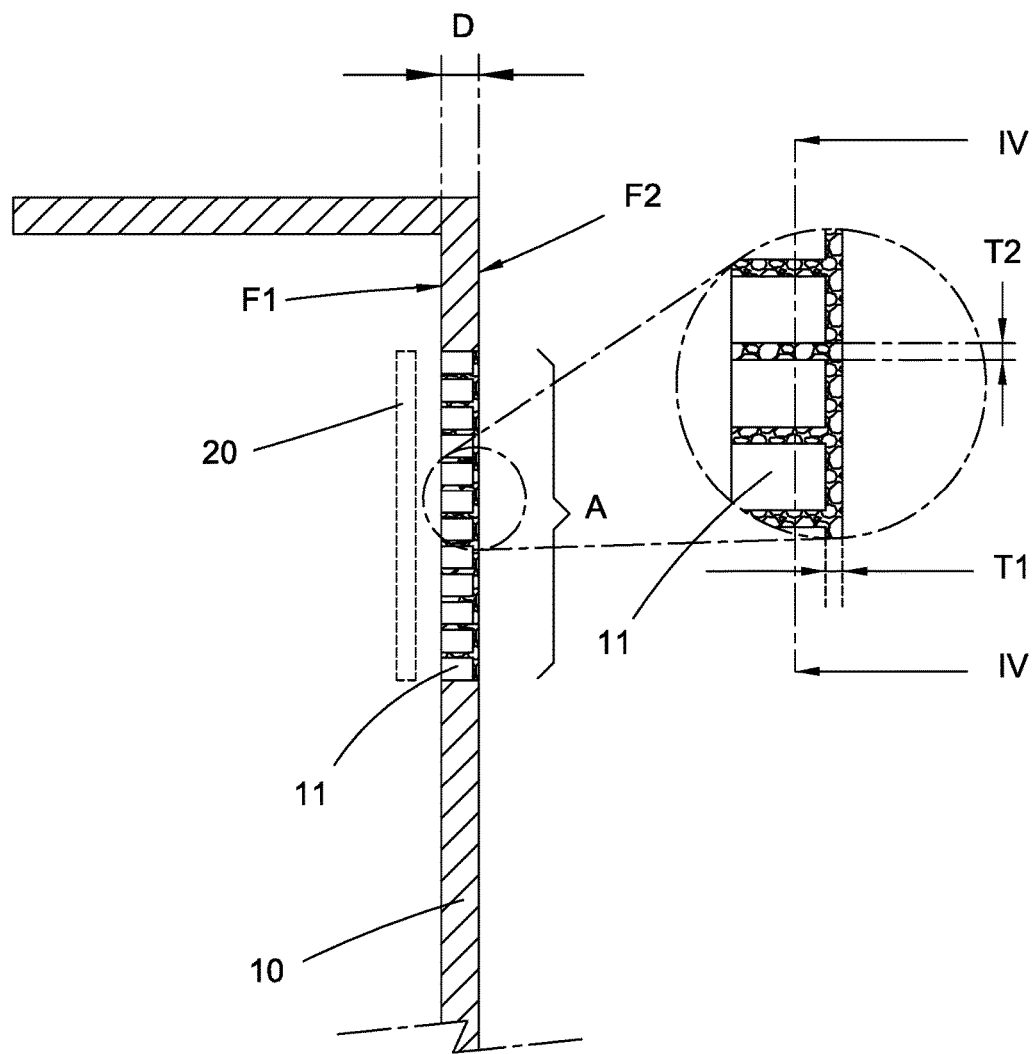
FIG. 3 is a cross sectional view showing the assembly of a part of a metal case of an electronic product according to another preferred embodiment of the present invention.

As shown in FIG. 3, in another embodiment, the modification area A has plural cavities 11 formed in the metal case 10, thus producing a honeycomb structure in the modification area A of the metal case 10 by way of the plural cavities 11, wherein a first thickness T1 and a second thickness T2 of the honeycomb structure are equal to the metal material thickness T, and the honeycomb structure is modified (completely ceramizated) to a metal oxide in the micro-arc oxidation (MAO) process, thus producing the radio waves guiding window to transmit the radio waves.

Figure 5:
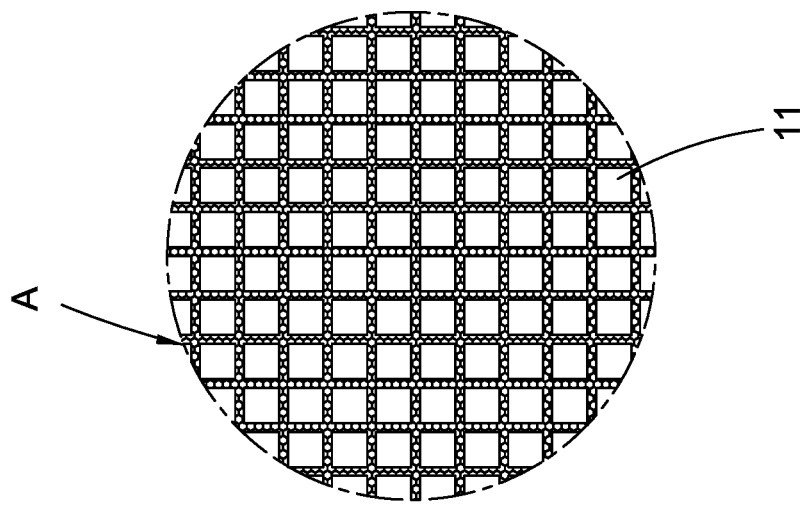
FIG. 5 is a cross sectional view showing the assembly of a part of a metal case of an electronic product according to another preferred embodiment of the present invention.
Figure 4:
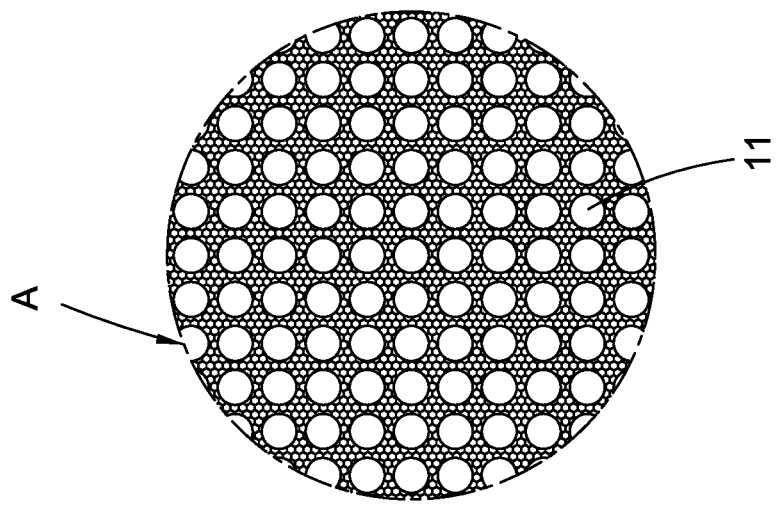
FIG. 4 is a cross sectional view taken along the line of IV-IVI of FIG. 3.

In another embodiment, the first thickness T1 and the second thickness T2 of the honeycomb structure are within 10 um to 800 um. In another embodiment, the first thickness T1 and the second thickness T2 of the honeycomb structure are within 200 um to 600 um. In one embodiment, the plural cavities 11 of the honeycomb structure do not pass through the metal case 10. In another embodiment, a cross section of the plural cavities 11 is circular (as shown in FIG. 4) or is rectangular (as illustrated in FIG. 5). Preferably, a thickness of any two adjacent cavities 11 is within 10 um to 800 um.

With reference to FIG. 2, in the thinning process, the flat thinning casing forms in the modification area A, and the metal material of the metal case is modified to the metal oxide in the micro-arc oxidation (MAO) process. As shown in FIG. 3, the honeycomb structure has a longitudinal depth D so as to enhance a structural strength of the radio waves guiding window, wherein the longitudinal depth D is a smallest distance between a first face F1 and a second face F2, the first face F1 is one surface of the metal case 10, and the second face F2 is another surface of the metal case 10 opposite to the first face F1.

Figure 6:
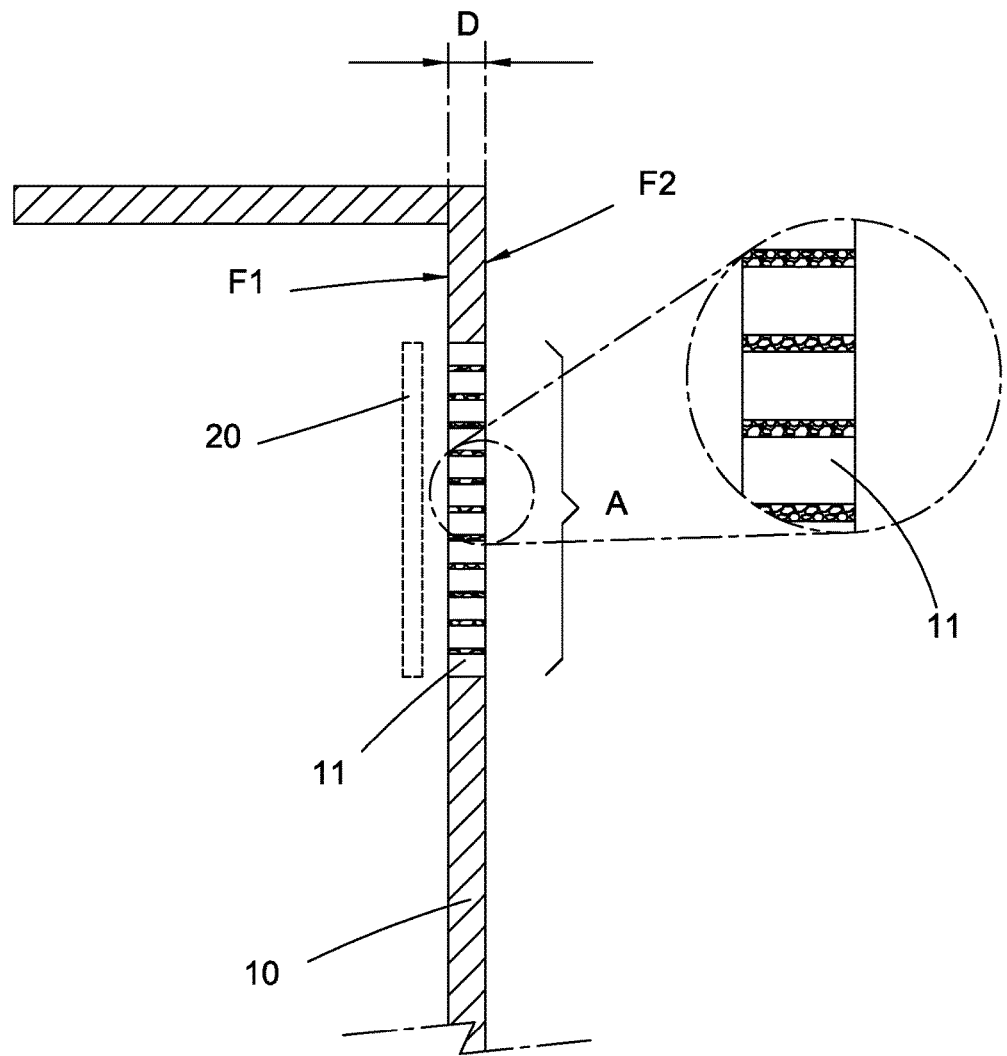
FIG. 6 is a cross sectional view showing the assembly of a part of a metal case of an electronic product according to another preferred embodiment of the present invention.

Referring to FIG. 6, in another embodiment, the plural cavities 11 of the honeycomb structure 11 pass through the metal case 10, hence the radio waves guiding window is reinforced and the honeycomb structure is modified to the metal oxide easily in the micro-arc oxidation (MAO) process.

Figure 7:
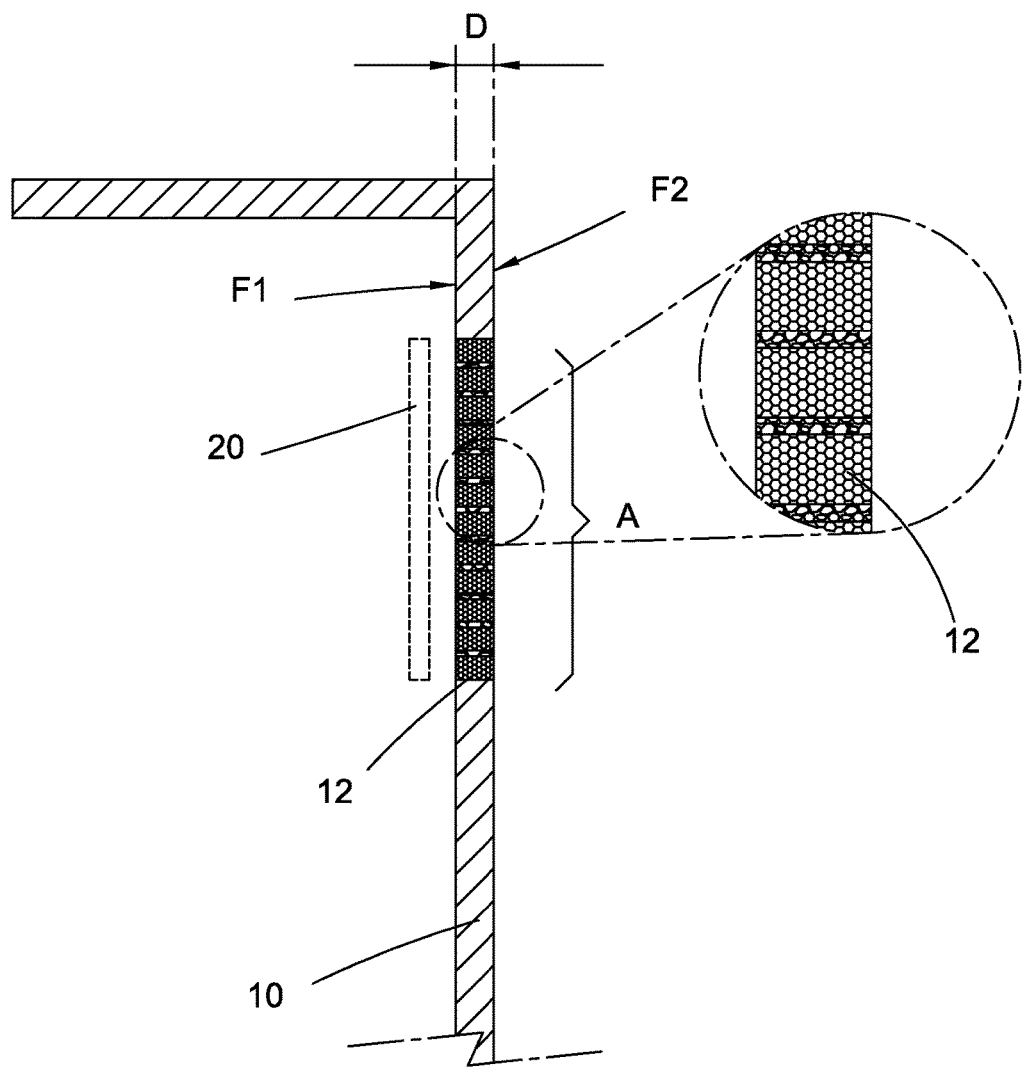
FIG. 7 is a cross sectional view showing the assembly of a part of a metal case of an electronic product according to another preferred embodiment of the present invention.

As shown in FIG. 7, in another embodiment, each of the plural cavities 11 of the honeycomb structure is filled with dielectric material powders 12 with a low dielectric coefficient, wherein the dielectric material powders 12 are any one of silicon dioxide (SiO2), magnesium oxide (MgO), aluminum oxide (Al2O3), and boron nitride (BN). Accordingly, the metal case 10 has brilliant appearance, transmits the radio waves smoothly, and is simplified.

While the preferred embodiments of the invention have been set forth for the purpose of disclosure, modifications of the disclosed embodiments of the invention as well as other embodiments thereof may occur to those skilled in the art. The scope of the claims should not be limited by the preferred embodiments set forth in the examples, but should be given the broadest interpretation consistent with the description as a whole.

What is claimed is:

1. A radio waves guiding window for a metal case being capable of transmitting radio waves smoothly and comprising: a metal case including a modification area defined at a position thereof where corresponds to an antenna, wherein a metal material thickness is formed by ceramizating the modification area in a micro-arc oxidation (MAO) process, and a metal material of the modification area is modified to a metal oxide in the micro-arc oxidation (MAO) process;

wherein the modification area has a honeycomb structure with plural cavities formed in the honeycomb structure, and a thickness of the honeycomb structure is within 10 um to 800 um.

2. The radio waves guiding window for the metal case as claimed in claim 1, wherein the metal case is made of any one of aluminum alloy, magnesium alloy, and titanium alloy.

3. The radio waves guiding window for the metal case as claimed in claim 1, wherein the modification area is a flat thinning casing and has a thickness within 10 um to 800 um.

4. The radio waves guiding window for the metal case as claimed in claim 1, wherein the modification area is a flat thinning casing and has a thickness within 200 um to 600 um.

5. The radio waves guiding window for the metal case as claimed in claim 1, wherein the thickness of the honeycomb structure is within 200 um to 600 um.

6. The radio waves guiding window for the metal case as claimed in claim 1, wherein the plural cavities of the honeycomb structure do not pass through the metal case.

7. The radio waves guiding window for the metal case as claimed in claim 1, wherein the plural cavities of the honeycomb structure pass through the metal case, each of the plural cavities of the honeycomb structure is filled with dielectric material powders with a low dielectric coefficient, and the dielectric material powders are any one of silicon dioxide (SiO2), magnesium oxide (MgO), aluminum oxide (Al2O3), and boron nitride (BN).

8. A manufacturing method of making a radio waves guiding window for a metal case comprising steps of:
- defining a modification area at a position of a metal case where corresponds to an antenna;
- forming a metal material thickness in the modification area in a thinning process; and
- modifying the modification area of the metal case in a micro-arc oxidation (MAO) process, wherein a metal material of the modification area is modified to a metal oxide;
- wherein the modification area has a honeycomb structure with plural cavities formed in the honeycomb structure, and a thickness of the honeycomb structure is within 10 um to 800 um.

9. The manufacturing method as claimed in claim 8, wherein the metal case is made of any one of aluminum alloy, magnesium alloy, and titanium alloy.

10. The manufacturing method as claimed in claim 8, wherein the modification area is a flat thinning casing and has a thickness within 10 um to 800 um.

11. The manufacturing method as claimed in claim 8, wherein the modification area is a flat thinning casing and has a thickness within 200 um to 600 um.

12. The manufacturing method as claimed in claim 8, wherein the thickness of the honeycomb structure is within 200 urn to 600 um.

13. The manufacturing method as claimed in claim 8, wherein the plural cavities of the honeycomb structure do not pass through the metal case.

14. The manufacturing method as claimed in claim 8, wherein the plural cavities of the honeycomb structure pass through the metal case, each of the plural cavities of the honeycomb structure is filled with dielectric material powders with a low dielectric coefficient, and the dielectric material powders are any one of silicon dioxide (SiO2), magnesium oxide (MgO), aluminum oxide (Al2O3), and boron nitride (BN).

* * * * *